United States Patent
Kitazawa et al.

(10) Patent No.: US 7,483,710 B2
(45) Date of Patent: Jan. 27, 2009

(54) TRANSMISSION POWER CONTROL METHOD, COMMUNICATION DEVICE, AND RADIO COMMUNICATION SYSTEM

(75) Inventors: Daisuke Kitazawa, Kawasaki (JP); Lan Chen, Yokohama (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 807 days.

(21) Appl. No.: 10/673,327

(22) Filed: Sep. 30, 2003

(65) Prior Publication Data

US 2004/0132405 A1 Jul. 8, 2004

(30) Foreign Application Priority Data

Oct. 3, 2002 (JP) .............................. P2002-291612

(51) Int. Cl.
*H04B 7/00* (2006.01)
*H04B 7/185* (2006.01)
*H04Q 7/20* (2006.01)

(52) U.S. Cl. .................... 455/522; 455/13.4; 455/452.2

(58) Field of Classification Search ................ 455/13.4, 455/522, 452.2
See application file for complete search history.

(56) References Cited

U.S. PATENT DOCUMENTS

| | | | |
|---|---|---|---|
| 5,933,763 A * | 8/1999 | Wang et al. ................. | 340/7.22 |
| 5,991,618 A | 11/1999 | Hall | |
| 6,272,340 B1 * | 8/2001 | Wright et al. ............... | 455/427 |
| 6,374,117 B1 | 4/2002 | Denkert et al. | |
| 6,738,646 B2 * | 5/2004 | Miyoshi et al. ............. | 455/561 |
| 6,792,248 B1 * | 9/2004 | Naghian ...................... | 455/69 |
| 6,865,179 B1 * | 3/2005 | Cao ............................. | 370/352 |

(Continued)

FOREIGN PATENT DOCUMENTS

EP 1 050 977 11/2000

(Continued)

OTHER PUBLICATIONS

Koo, Insoo; Yang, Jeongrok; Choi, Yeongyoon; Kim, Kiseon; Capacity-Optimized Power Allocation Scheme in an Integrated Voice and Data DS-CDMA System, copyright 1999 IEEE.*

(Continued)

*Primary Examiner*—Matthew D. Anderson
*Assistant Examiner*—Bobbak Safaipour
(74) *Attorney, Agent, or Firm*—Oblon, Spivak, McClelland, Maier & Neustadt, P.C.

(57) ABSTRACT

In a radio communication system where, concerning the maximum allowable delay and the reception error rate as required values for QoS, a first mobile station group of which the maximum allowable delay is less than a reference value and the reception error rate is a reference value or more, and a second mobile station group of which the maximum allowable delay is a reference value or more and the reception error rate is less than a reference value coexist, the base station sets the transmission power margin for a mobile station of the first mobile station group to be higher than the transmission power margin for a mobile station of the second mobile station group, and a mobile station of the first mobile station group sets the transmission power margin to be higher than the transmission power margin of a mobile station of the second mobile station group.

7 Claims, 14 Drawing Sheets

U.S. PATENT DOCUMENTS

| | | | | |
|---|---|---|---|---|
| 7,142,867 | B1* | 11/2006 | Gandhi et al. | 455/453 |
| 2001/0055972 | A1* | 12/2001 | Sakata | 455/452 |
| 2002/0009998 | A1* | 1/2002 | Reemtsma | 455/449 |
| 2002/0160783 | A1* | 10/2002 | Holtzman et al. | 455/452 |
| 2003/0076834 | A1* | 4/2003 | Davis | 370/395.1 |
| 2003/0087659 | A1* | 5/2003 | Wang | 455/517 |
| 2006/0078059 | A1* | 4/2006 | Ok et al. | 375/260 |

FOREIGN PATENT DOCUMENTS

| | | |
|---|---|---|
| JP | 07-250377 | 9/1995 |
| JP | 8-167872 | 6/1996 |
| JP | H10/336104 | 12/1998 |
| JP | 2000-91985 | 3/2000 |
| JP | 2001-7764 | 1/2001 |
| WO | 00/04649 | 1/2000 |
| WO | WO 00/04649 | 1/2000 |

OTHER PUBLICATIONS

T. Ito, et al., Vehicular Technology Conference, vol. 3, conf. 49, XP-000936169, pp. 2039-2043, "A Wireless Packet Transmission With Adaptive Processing Gain and Transmitter Power Control Scheme for Circuit-Switched and Packet-Switched Modes Integrated DS/CDMA Systems", May 16, 1999.

I. Koo, et al., IEEE Tencon, XP-010368510, pp. 1178-1181, "Capacity-Optimized Power Allocation Scheme in an Integrated Voice and Data DS-CDMA System", Sep. 15, 1999.

\* cited by examiner

Fig.6A
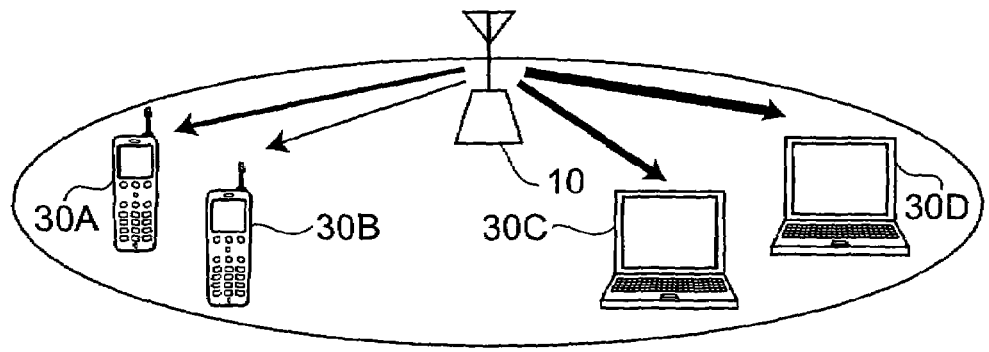
Fig.6B
<PRIOR ART (SAME MARGIN)>
Fig.6C
<WHEN PRESENT INVENTION IS APPLIED>
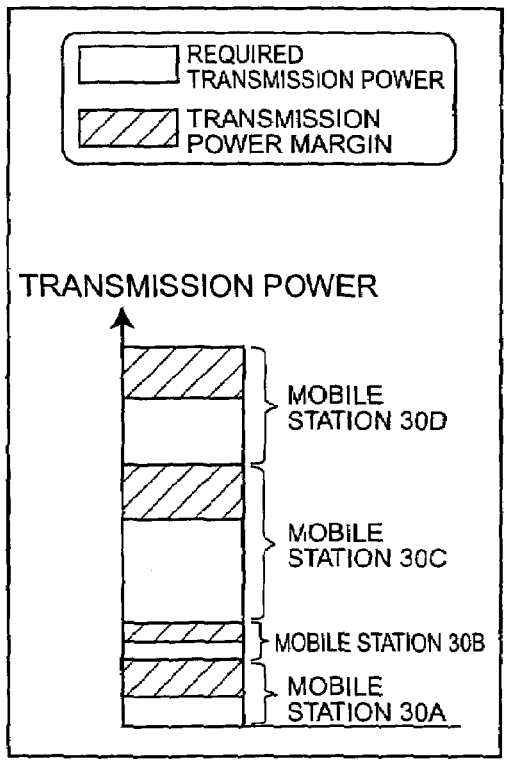
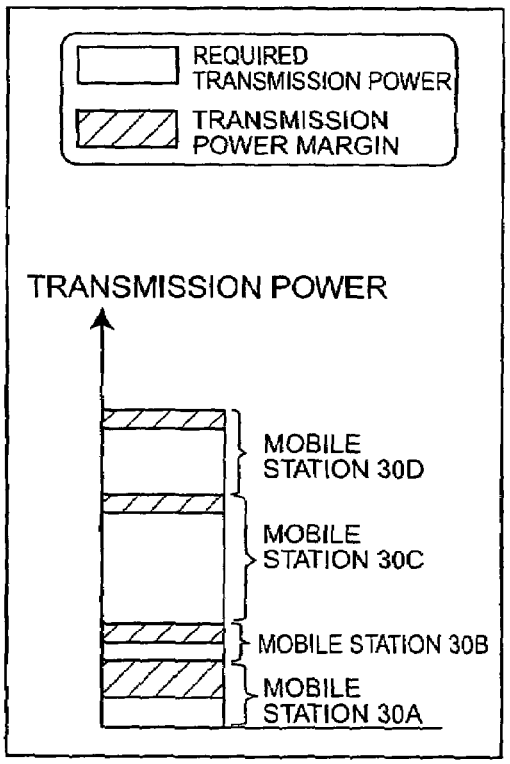

TRANSMISSION POWER CONTROL METHOD, COMMUNICATION DEVICE, AND RADIO COMMUNICATION SYSTEM

BACKGROUND OF THE INVENTION

1. Field of the Invention

The present invention relates to transmission power control method, communication device and radio communication system, for transmission power control and communication quality control.

2. Related Background Art

For future radio communication systems, the implementation of multimedia services is demanded, so it is indispensable to implement control while being conscious of the demand for quality (QoS: Quality of Service), which differs depending on the application. In particular, the demanded values for various factors, including the reception quality (BER: Bit Error Rate), allowable transmission delay, transmission speed, the maximum count of retransmission of transmission data, and the rate of data not received, differ between real-time applications such as voice communication, and non-real-time applications such as data communication. Also the traffic generation pattern and the transmission data volume are considerably different, and various aspects must be considered. On the other hand, it is also important to support QoS demands as well as using radio resources at high efficiency, since resources in radio communication are limited.

In radio communication, reception quality is not constant, but changes constantly because of such influences as the radical change of the propagation path environment and interference by other signals which use the same frequency band. In order to reduce the influence of the changes of the propagation path and interface at the reception side, the transmission side generally transmits data adding a margin to the minimum transmission power to be required in order to achieve the reception quality demanded at the reception side.

This transmission power margin has been a constant value in prior art, but by changing this margin, depending on the QoS request and the data transmission frequency, the limited resources of radio can be effectively used and QoS can be supported.

An example of prior art focusing on QoS and transmission power is the "Power control method for communication systems", stated in Japanese Patent Application Laid-Open 2000-91985. This is a method for the CDMA (Code Division Multiple Access) system in FIG. 13A, where the traffic of voice communication and data communication (required bit error rate is different) coexist, wherein the quality of the voice terminal is monitored and the transmission power and the transmission rate of the data terminal is gradually increased without influencing the quality of the voice terminal. However, the power margin is the same for each type of traffic, as shown in FIG. 13B, and no consideration is taken for retransmission. Generally a data terminal which requires a higher speed of transmission without reception errors, more so than a voice terminal, has a higher transmission power, but if a same margin as a voice terminal is provided, a large interference is generated to peripheral mobile stations. Particularly in a CDMA system which uses the same frequency band for all the cells, an increase of interference greatly affects communication quality.

As a prior art focusing on the number of retransmission times of data and the transmission power, "Method for transmission via wireless links", stated in Japanese Patent Application Laid-Open No. 2001-7764, is a Method based on the number of received ACKs, and is a technology for increasing or decreasing the transmission power level according to the size of the value of (number of lost ACKs)/(Number of transmitted ACKs). With this technology, however, a long control time interval must be taken in order to count the number of ACKs, which makes it difficult to perform strict control with a short control time interval.

"Mobile radio communication system and power control method", stated in Japanese Patent Application Laid-Open No. H8-167872, on the other hand, discloses a technology for changing the value of the transmission power margin without keeping it constant. This technology, however, only changes the value of the margin according to the size of the fading fluctuation, as shown in FIG. 14, and aims at decreasing the power consumption of a mobile station, for example, by decreasing the margin when the drop in the reception level by fading is small. Therefore with this technology, it is difficult to sufficiently support QoS, a critical element, in the next generation of mobile communication systems.

As described above, in prior art aiming at supporting QoS, the margin to be provided to transmission power is uniform, and a method for changing the transmission power margin according to QoS or the data retransmission frequency has not yet been proposed.

However setting the margin according to the QoS and the data retransmission frequency is a desired technology as one of the control technologies to support QoS and to use radio resources effectively. Particularly for future radio communication systems, support of QoS demanded by users is indispensable, and performing control while considering QoS in not only applications and higher layers but also in physical layers and link layers is critical, so setting the margin according to QoS and the retransmission frequency is highly anticipated.

To solve the above problems, it is an object of the present invention to provide a transmission power control method, communication device and radio communication system, which can support various QoS demands and effectively use radio resources.

SUMMARY OF THE INVENTION

The transmission power control method according to the present invention sets the margin to be provided to the transmission power by the following two types of methods.

The first one is the method that the transmission power margin is set based on a predetermined required value for the communication service quality, and the second one is the method that the transmission power margin is set based on the data retransmission count.

The first transmission power control method according to the present invention is a transmission power control method in a radio communication system comprising a base station and mobile stations, where a transmission power margin provided to the required transmission power to satisfy a reception error rate required for radio communication between the base station and the mobile stations, is set based on a predetermined required value for communication service quality. The setting can be done by the base station and the setting can be done by the mobile station.

According to the invention, when the required transmission power is small and data retransmission is hardly allowed, as in the case of such real-time traffic as voice communication, the reception error can be decreased by increasing the margin. In other words, the non-reception rate of data in real-time traffic can be decreased, and communication quality can be improved.

In the case of non-real-time traffic (e.g. data communication), where the demanded transmission power is high and the retransmission of data is allowed, interference given to the peripheral area is high, and the influence of reception errors can be recovered by transmission, therefore the margin is set to be low. For non-real-time traffic, high quality reception and high-speed transmission are required, and the demanded transmission power before providing a margin is high, so if the data is sent with a large margin, the interference given to the peripheral area becomes high.

Particularly in the case of using a same frequency band for all the cells, as in the case of a CDMA cellular system, the influence of interference given to the communication quality of other mobile stations is even larger, and when an entire system is given consideration, the influence of the interference given to the peripheral area due to transmitting with a large margin is more serious than the influence on the time required for transmission, which becomes longer due to retransmission. This is because only a mobile station where a reception error occurs retransmits the data, not all the mobile stations using the non-real-time application will have a reception error and retransmit the data. So concerning non-real-time traffic, the value of the margin is set to be smaller than the case of real-time traffic, and a reception error is recovered by retransmission only when a reception error occurs, then high communication quality can be maintained, even in non-real-time traffic.

The second transmission power control method according to the present invention is a transmission power control method in a radio communication system comprising abase station and mobile stations, where data retransmission is allowed in radio communication between the base station and the mobile stations, wherein a transmission power margin provided to a required transmission power to satisfy a reception error rate required for radio communication between the base station and the mobile stations, is set so that the transmission power margin increases as the data retransmission count in an uplink or in a downlink increases.

Under conditions where data retransmission is allowed, a mobile station where the status of the propagation path environment continuously changes a lot, a reception error frequency occurs and retransmission is repeated, so the resource utilization efficiency decreases. Therefore when the retransmission count increases, the margin is gradually increased, so the probability when a reception error occurs is decreased, and a drop in the resource utilization efficiency can be prevented.

The invention according to the transmission power control method can also be described as an invention of an object, more particularly as an invention of a communication device (which includes both a base station and a mobile station), and as an invention of a radio communication system comprising a base station and a mobile station.

A communication device according to the present invention is a communication device comprising means of determining a transmission power required for satisfying communication service quality required for radio communication with other communication devices, and means of transmitting data by allocating a radio resource based on the determined transmission power and transmitting data using said radio resource, further comprising: type judging means for judging a type of the communication service quality required for said radio communication; margin setting means for setting a transmission power margin based on the judged type; and transmission power determination means for determining a transmission power based on the set transmission power margin and said required transmission power.

And a communication device according to the present invention is characterized wherein said communication device positions in a radio communication system, where concerning a maximum allowable delay and a reception error rate as required values for the communication service quality, a first communication device group of which the maximum allowable delay is less than a predetermined reference value and the reception error rate is a predetermined reference value or more, and a second communication device group of which the maximum allowable delay is a predetermined reference value or more and the reception error rate is less than a predetermined reference value coexist, and said margin setting means sets the transmission power margin for a communication device of the first communication device group to be higher than the transmission power margin for a communication device of the second communication device group.

And a communication device according to the present invention is a communication device comprising means of determining a transmission power required for satisfying a communication service quality required for radio communication with other communication devices, and means of allocating a radio resource based on the determined transmission power and transmitting data using said radio resource, where data retransmission is allowed via said radio communication, further comprising: retransmission count storing means for counting a retransmission count when a same data is retransmitted and storing said retransmission count; margin setting means for setting a transmission power margin so as to increase the transmission power margin as said retransmission count increases; and transmission power determination means for determining a transmission power based on the set transmission power margin and said required transmission power.

And a communication device according to the present invention is a communication device comprising means of determining a transmission power required for satisfying a communication service quality required for radio communication with other communication devices, and means of transmitting data using the determined transmission power, further comprising: margin setting means for setting a transmission power margin based on a predetermined required value for the communication service quality required for said radio communication; and transmission power determination means for determining a transmission power based on the set transmission power margin and said required transmission power.

And a communication device according to the present invention is characterized wherein said communication device positions in a radio communication system, where concerning a maximum allowable delay and a reception error rate as required values for communication service quality, a first communication device group of which the maximum allowable delay is less than a predetermined reference value and the reception error rate is a predetermined reference value or more, and a second communication device group of which the maximum allowable delay is a predetermined reference value or more and the reception error rate is less than a predetermined reference value coexist, and said margin setting means sets the transmission power margin to be higher than the transmission power margin of a communication device of the second communication device group when the local device itself belongs to the first communication device group, and sets the transmission power margin to be lower than the transmission power margin of a communication device of the first communication device group when the local device itself belongs to the second communication device group.

A radio communication system according to the present invention comprising a base station which comprises means of determining a transmission power required for satisfying communication service quality required for radio communication with a mobile station, and means of transmitting data by allocating a radio resource based on the determined transmission power and transmitting data using said radio resource, and a mobile station which comprises means of determining a transmission power required for satisfying a communication service quality required for radio communication with a base station, and means of transmitting data using the determined transmission power;

the radio communication system is characterized, wherein said base station further comprises: type judging means for judging a type of the communication service quality required for said radio communication; margin setting means for setting a transmission power margin based on the judged type; and transmission power determination means for determining a transmission power based on the set transmission power margin and said required transmission power;

and wherein said mobile station further comprises: margin setting means for setting a transmission power margin based on a predetermined required value for the communication service quality required for said radio communication; and transmission power determination means for determining a transmission power based on the set transmission power margin and said required transmission power.

Concerning a maximum allowable delay and a reception error rate as the required values for communication service quality, the radio communication system according to the present invention could be a radio communication system comprising, a first mobile station group of which the maximum allowable delay is less than a predetermined reference value and the reception error rate is a predetermined reference value or more, a second mobile station group of which the maximum allowable delay is a predetermined reference value or more and the reception error rate is less than a predetermined reference value, and a base station, wherein concerning a transmission power margin provided to a predetermined transmission power for satisfying the reception error rate required for radio communication and the mobile stations, the base stations sets the transmission power margin for a mobile station of the first mobile station group to be higher than the transmission power margin for a mobile station of the second mobile station group, a mobile station of the first mobile station group sets the transmission power margin to be higher than the transmission power margin of a mobile station of the second mobile station group, and a mobile station of the second mobile station group sets the transmission power margin to be lower than the transmission power margin of a mobile station of the first mobile station group.

A radio communication system according to the present invention comprising a base station which comprises means of determining a transmission power required for satisfying a communication service quality required for radio communication with a mobile station, and means of allocating a radio resource based on the determined transmission power and transmitting data using said radio resource, where data retransmission is allowed via said radio communication, and a mobile station which comprises means of determining a transmission power required for satisfying a communication service quality required for radio communication with a base station, and means of transmitting data using the determined transmission power, where data retransmission is allowed via said radio communication;

the radio communication system is characterized, wherein both said base station and said mobile station further comprise: retransmission count storing means for counting a retransmission count when a same data is retransmitted and storing said retransmission count; margin setting means for setting a transmission power margin so as to increase the transmission power margin as said retransmission count increases; and transmission power determination means for determining a transmission power based on the set transmission power margin and said required transmission power.

BRIEF DESCRIPTION OF THE DRAWINGS

FIG. 6A is a diagram depicting the radio communication system of the first embodiment;

FIG. 6B is a graph indicating the transmission power margin which is set by prior art;

FIG. 6C is a graph indicating the transmission power margin which is set by the present invention;

DESCRIPTION OF THE PREFERRED EMBODIMENTS

Embodiments of the present invention will now be described in detail with reference to the accompanying drawings.

First Embodiment

Figure 1:
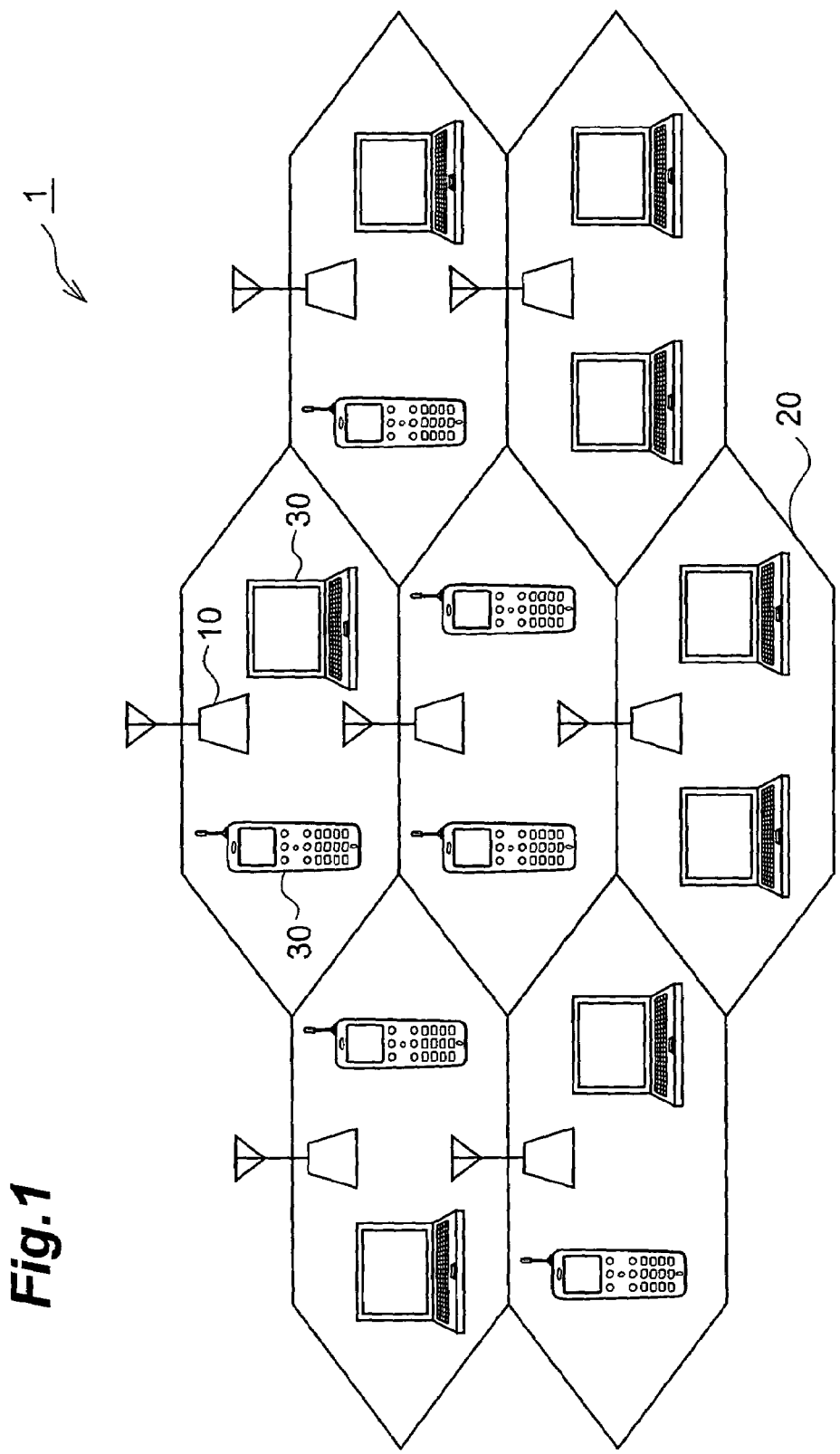
FIG. 1 is a block diagram depicting the radio communication system according to the first embodiment.

FIG. 1 shows an example of the radio communication system according to the first embodiment of the present invention. The radio communication system 1 is a large scale cellular system comprised of cells 20 operated by a plurality of base stations 10 respectively, where various mobile stations 30 existing in each cell 20 send various QoS requests using various applications. A mobile station 30 which performs radio communication outdoors frequently moves and receives interference from the peripheral cells, so it is difficult to secure a radio propagation path with good communication quality all the time. Supporting QoS in such an environment requires advanced control, and limited radio resources must be shared by many mobile stations 30. In the following embodiment, such an environment is used as an example in the description, but the present invention can also be applied to other radio communication systems, such as wireless LAN and fixed wireless system.

The present invention will now be described using a CDMA cellular system as an example. Here an environment where TPC (Transmission Power Control) is being performed based on the required SIR (Signal to Interference power Ratio), which is determined for each application, is assumed. In this case, the transmission power in each uplink and downlink differs depending not only on the QoS request from each mobile station, but also on the position of the mobile station and the reception status of the radio channel.

Figure 2:
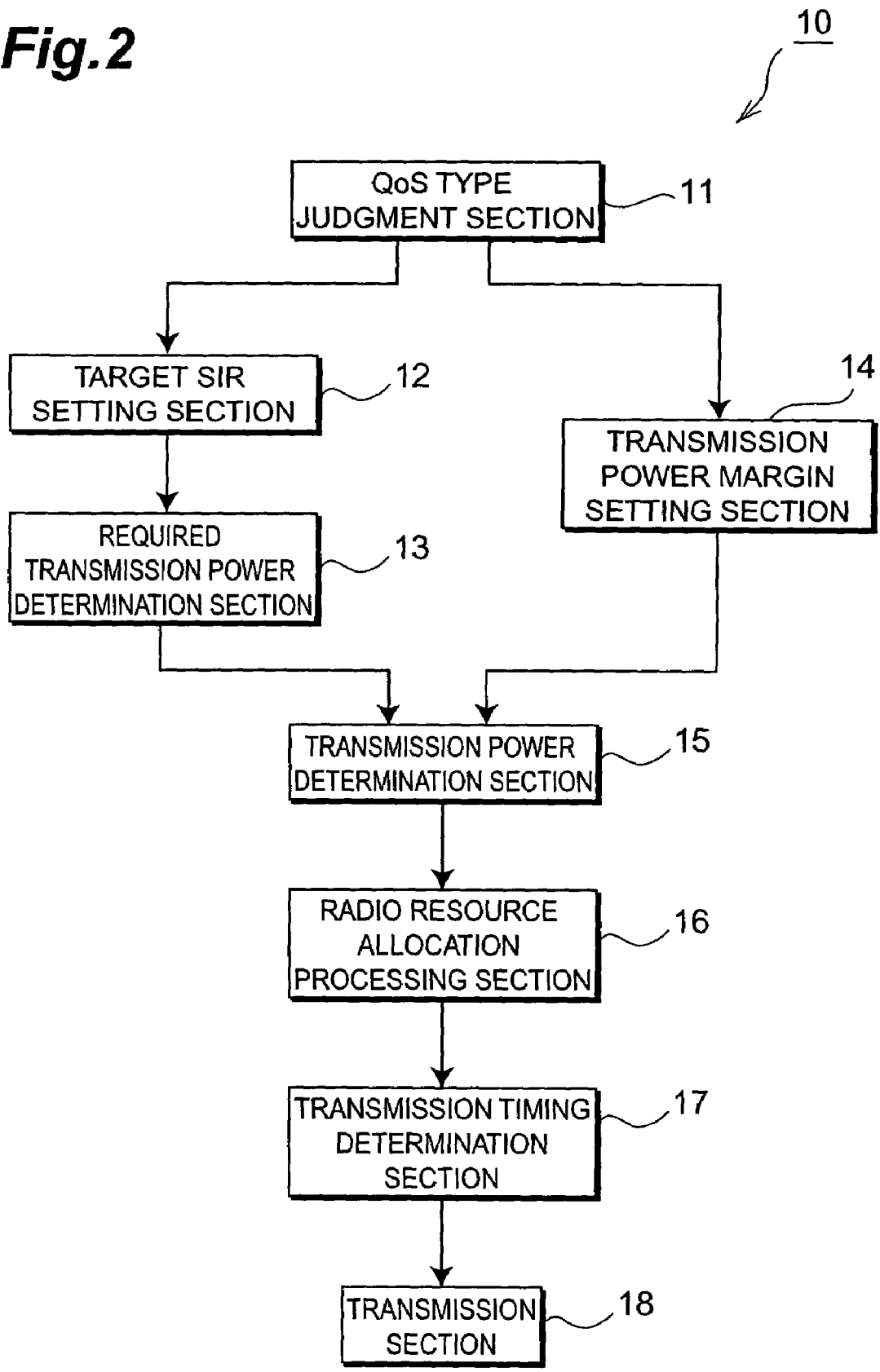
FIG. 2 is a functional block diagram depicting the configuration of the base station according to the first embodiment.

The case when the present invention is applied to a downlink will be described first. FIG. 2 shows a configuration of the functional blocks of the base station 10 and the flow of signals. As FIG. 2 shows, the base station 10 is comprised of a QoS type judgment section 11 for judging the QoS type in communication with the target mobile station 30, as described later, for traffic coming from the network, a transmission power margin setting section 14 for setting the transmission power margin based on the judged QoS type (real-time or non-real-time), a target SIR setting section 12 for setting the target SIR for achieving an optimum reception error rate based on the judged QoS type, a required transmission power determination section 13 for estimating the attenuation of a radio propagation path between the base station and the mobile station, and determining the required transmission power to reach the target SIR, a transmission power determination section 15 for determining the transmission power including the margin, a radio resource allocation processing section 16 for allocating a radio resource based on the determined transmission power, a transmission timing determination section 17 for determining the timing of data transmission, and a transmission section 18 for transmitting data.

Figure 3:
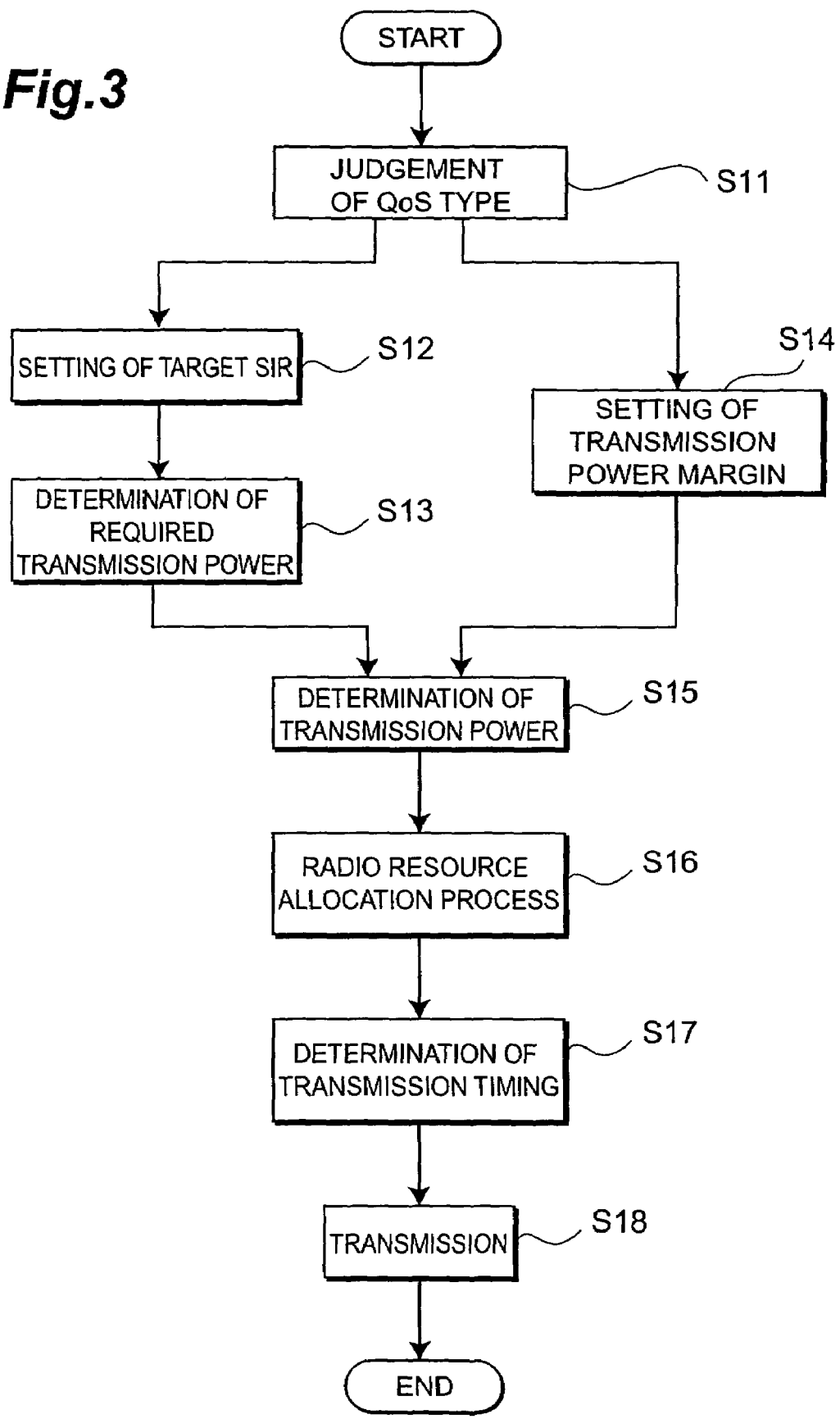
FIG. 3 is a flow chart depicting processing for the downlink in the base station according to the first embodiment.

FIG. 3 shows a flow chart depicting processing in the above mentioned base station 10. In the case of a downlink, the QoS type judgment section 11 judges the QoS type in the communication with the target mobile station 30 for traffic coming from the network (S11 in FIG. 3). Specifically, the QoS type judgment section 11 checks the information on the transmission delay, reception error rate and maximum retransmission count, and judges this traffic as real-time traffic if the requirement for transmission delay is strict, the requirement for reception error rate is not strict, and retransmission is not allowed. If the requirement for transmission delay is not strict, requirement for reception error rate is strict, and retransmission is allowed, the QoS type judgment section 11 judges that this traffic is non-real-time traffic. This QoS type is determined when the call is connected or in advance if the communication type is line-switched communication, and if the communication type is packet-switched communication, the QoS type is determined when the connection starts or when information on QoS has been written for each packet.

In S14, the transmission power margin setting section 14 sets the margin according to the QoS type (real-time or non-real-time) acquired in the judgment in S11, where the margin is set large if this traffic is real-time traffic, and the margin is set small if this traffic is non-real-time traffic.

In S12, the target SIR setting section 12 sets the target SIR for achieving the reception error rate based on the information on the reception error rate acquired in the judgment in S11, and in the next S13, the required transmission power determination section 13 estimates the attenuation of the radio propagation path between the base station and the mobile station, and determines the required transmission power to achieve the target SIR.

And in S15, the transmission power determination section 15 determines the transmission power including the margin based on the required transmission power determined in S13 and the margin set in S14. Then in S16, the radio resource allocation processing section 16 allocates the radio resource to the mobile station 30 according to the transmission power including the above mentioned margin. And in S17, the transmission timing determination section 17 determines the transmission timing of the data transmission, and in S18, the transmission section 18 transmits the data at this transmission timing. The above mentioned processing flow in FIG. 3 must be executed for each TPC cycle, since the required transmission power or the target communication quality changes depending on the cycle of TCP processing.

Figure 4:
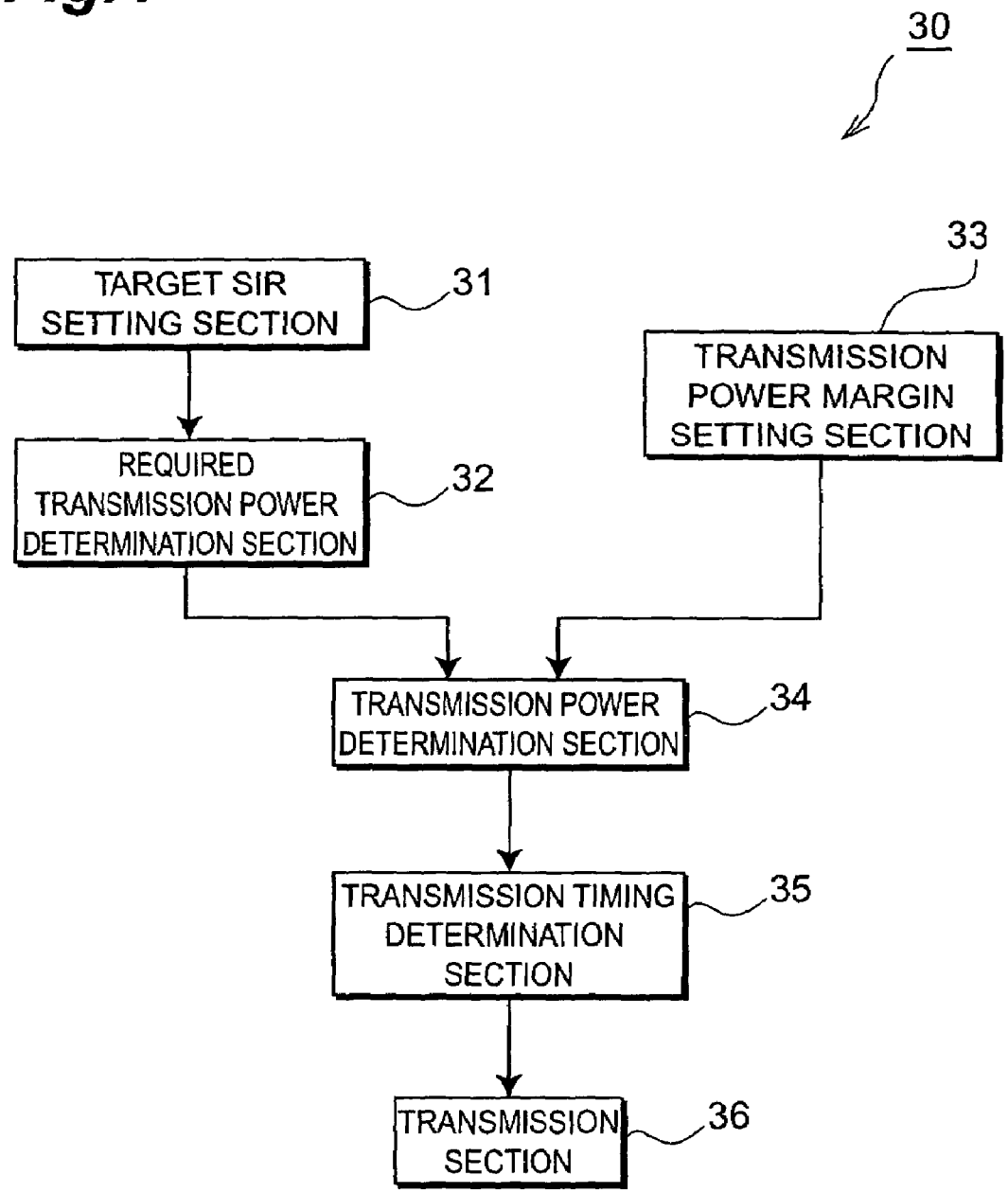
FIG. 4 is a functional block diagram depicting the configuration of the mobile station according to the first embodiment.

Now the case of when the present invention is applied to an uplink will be described. FIG. 4 shows a configuration of the functional blocks of the mobile station 30 and a flow of signals. As FIG. 4 shows, the mobile station 30 has a similar configuration as the above mentioned base station 10 in FIG. 2, as a configuration according to the present invention, but is different from the base station 10 in FIG. 2 in that the mobile station 30 does not have the QoS type judgment section 11 and the radio resource allocation processing section 16. This is because in the uplink, QoS information is in the mobile station 30, which is the transmission side, so judgment of QoS is unnecessary, and the base station 10 communicating with this mobile station 30 allocates the radio resource, which is not included in the processing performed by the mobile station 30. Operation of the other sections are the same as the case in FIG. 2.

Figure 5:
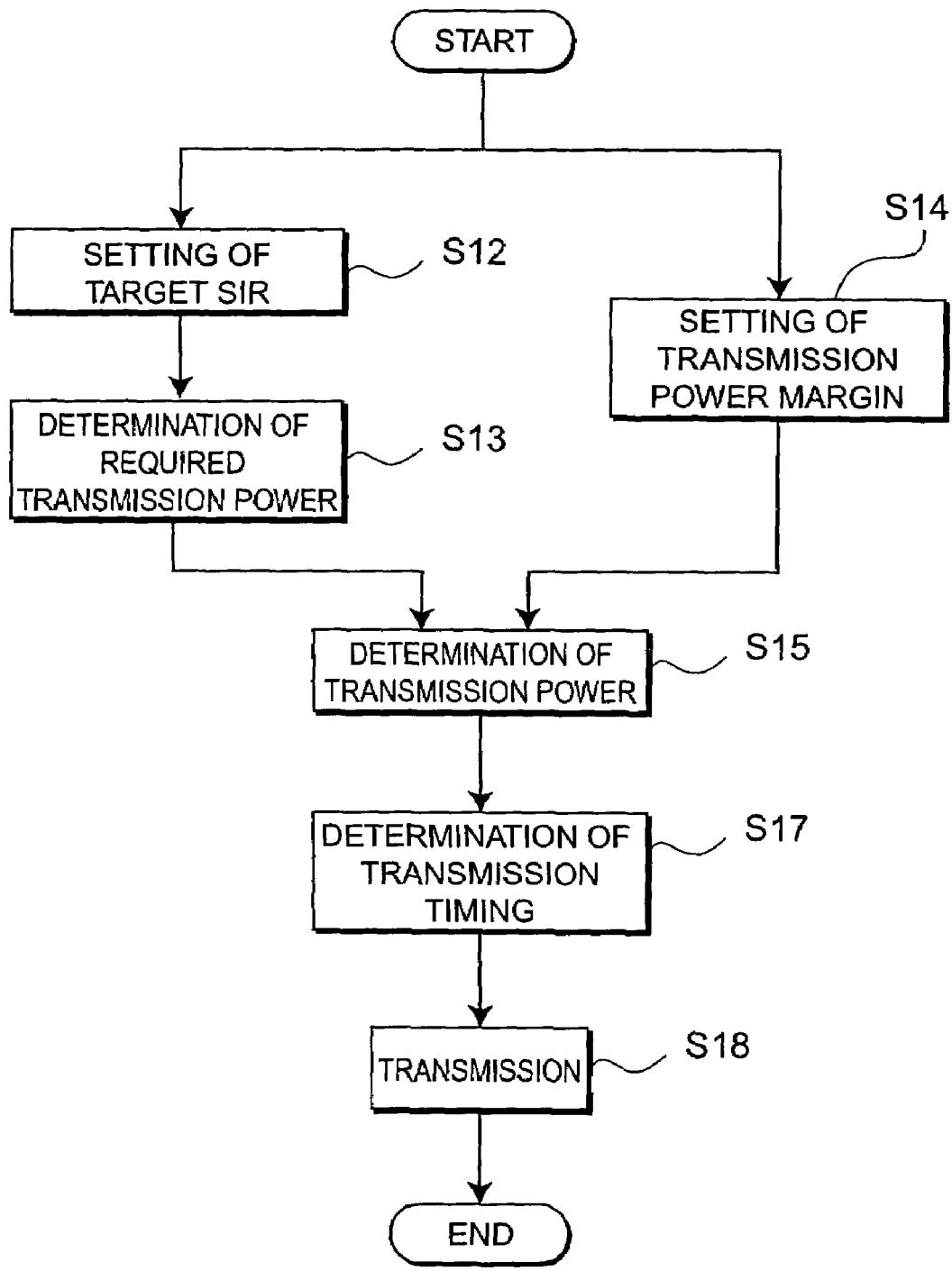
FIG. 5 is a flow chart depicting processing for the uplink in a mobile station according to the first embodiment.

FIG. 5 shows a flow chart depicting processing in the above mentioned mobile station 30. Processing identical with that in FIG. 3 is denoted with identical numerals. In S14 in FIG. 5, the transmission power margin setting section 33 sets the transmission power margin according to the QoS information (real-time or non-real-time), where the margin is set large if this traffic is real-time traffic, and the margin is set small if this traffic is non-real-time traffic.

In S12, the target SIR setting section 31 sets the target SIR for achieving the reception error rate based on the information on the reception error rate according to the QoS information, and in the next S13, the required transmission power determination section 32 estimates the attenuation of the radio propagation path between the base station and the mobile station, and determines the required transmission power to achieve the target SIR.

And in S15, the transmission power determination section 34 determines the transmission power including the margin based on the required transmission power determined in S13 and the margin set in S14. Then in S17, the transmission timing determination section 35 determines the transmission timing of the data transmission, and in S18, the transmission section 36 transmits the data at this transmission timing.

Now the effect of the present embodiment will be described in detail with reference to FIG. 6A-FIG. 6C. In FIG. 6A, one base station 10 and the mobile stations 30A-30D are communicating, where the mobile stations 30A and 30B are using a real-time application, and the mobile stations 30C and 30D are using a non-real-time application. The data transmission direction is downward (direction from the base station 10 to each mobile station 30).

In prior art, as FIG. 6B shows, a margin is provided equally to each mobile station 30, regardless the type of application, so as to be a predetermined ratio with respect to the required transmission power value. However, if a margin equivalent to the margin provided to the mobile stations 30A and 30B, which are using a real-time application, is provided to the mobile stations 30C and 30D, which are using a non-real-time application, data is transmitted with a very high transmission power to the mobile stations 30C and 30D, which decreases the efficiency of using the power resource, and this transmission power induces interference to other mobile stations. If the margin to each mobile station 30 is uniformly decreased to suppress the transmission power to the mobile stations 30C and 30D, on the other hand, the reception quality of the mobile stations 30A and 30B also drops, and reception error increases at the mobile stations 30A and 30B. Since data retransmission is hardly allowed in the mobile stations 30A and 30B, communication quality drops considerably.

If the present invention is applied, on the other hand, the margin to be provided to the mobile stations 30C and 30D are set smaller compared with the mobile stations 30A and 30B, as shown in FIG. 6C, so while guaranteeing the reception quality of the mobile stations 30A and 30B, the transmission power to the mobile stations 30C and 30D can be decreased. As a result, the interference power which influences the peripheral areas can be decreased, and the propagation characteristic of the entire system can be improved. If the interference resistance power of a peripheral mobile station is sufficient, a plurality of data can be transmitted simultaneously, and considering that the data volume to be transmitted simultaneously is limited by the transmission power, the data volume to be transmitted simultaneously can be increased if the margin is decreased and data is transmitted with minimum power.

In the case of non-real-time traffic, data is generated in bursts, so the present embodiment which can transmit more data stored in the transmission buffer at one time is very effective. For the mobile stations 30C and 30D, which use a non-real-time application, a transmission delay is allowed to some extent, so if the reception error caused by decreasing the margin can be recovered by retransmitting the data, then the communication quality of the mobile stations 30C and 30D can be maintained at a certain level or higher. If the present invention is applied to the entire system, the interference power from the other base station 10 to the mobile stations 30C and 30D is decreased, so the reception error in the mobile stations 30C and 30D can also be decreased.

Second Embodiment

Figure 7:
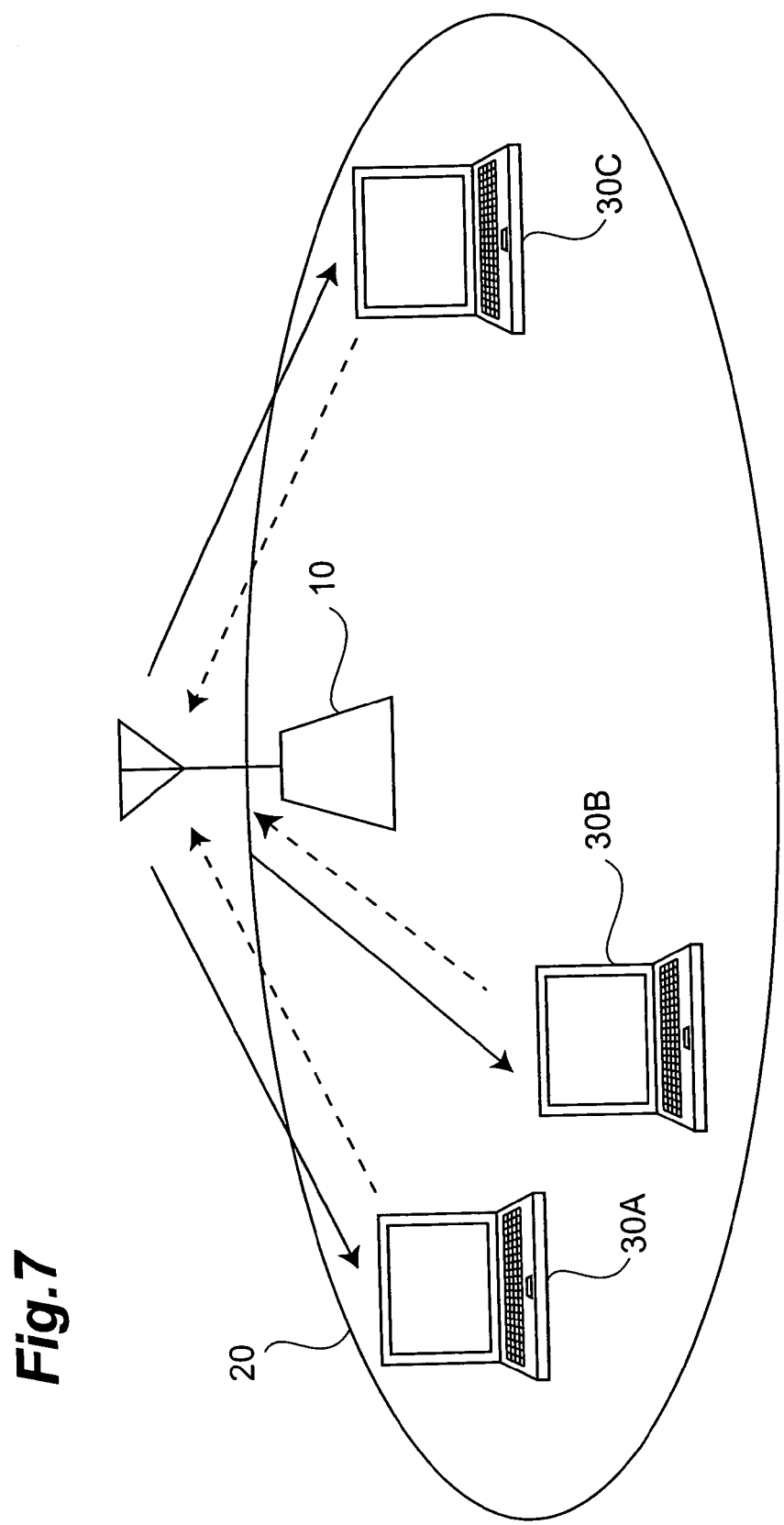
FIG. 7 is a block diagram depicting the radio communication system according to the second embodiment.

FIG. 7 shows an example of the radio communication system according to the second embodiment of the present invention. FIG. 7 is a cell 20 of a cellular system, like that in FIG. 1, where the mobile stations 30A-30C, using a non-real-time application in which a plurality of retransmissions of the same data is allowed, exist. FIG. 7 shows an example when the base station 10 transmits data via a downlink, and if the mobile stations 30A-30C received data without error respectively, ACK is transmitted to the base station 10 via an uplink. The present invention can also be applied when NACK (Negative Acknowledgment), instead of ACK, is transmitted.

The present embodiment will be described using a CDMA cellular system as an example. Here an environment where TPC is performed based on the required SIR, which is determined depending on the application, is assumed. In this case, the transmission power in each uplink and downlink differs depending not only on the QoS request of each mobile station, but also on the position of the mobile station and the reception status of the radio channel.

The important point of the present embodiment is that the transmission side (base station 10 or mobile station 30$x$ in FIG. 7) only acknowledges the count of retransmission of the same data, where the invention according to the transmission power control method can be applied.

Figure 8:
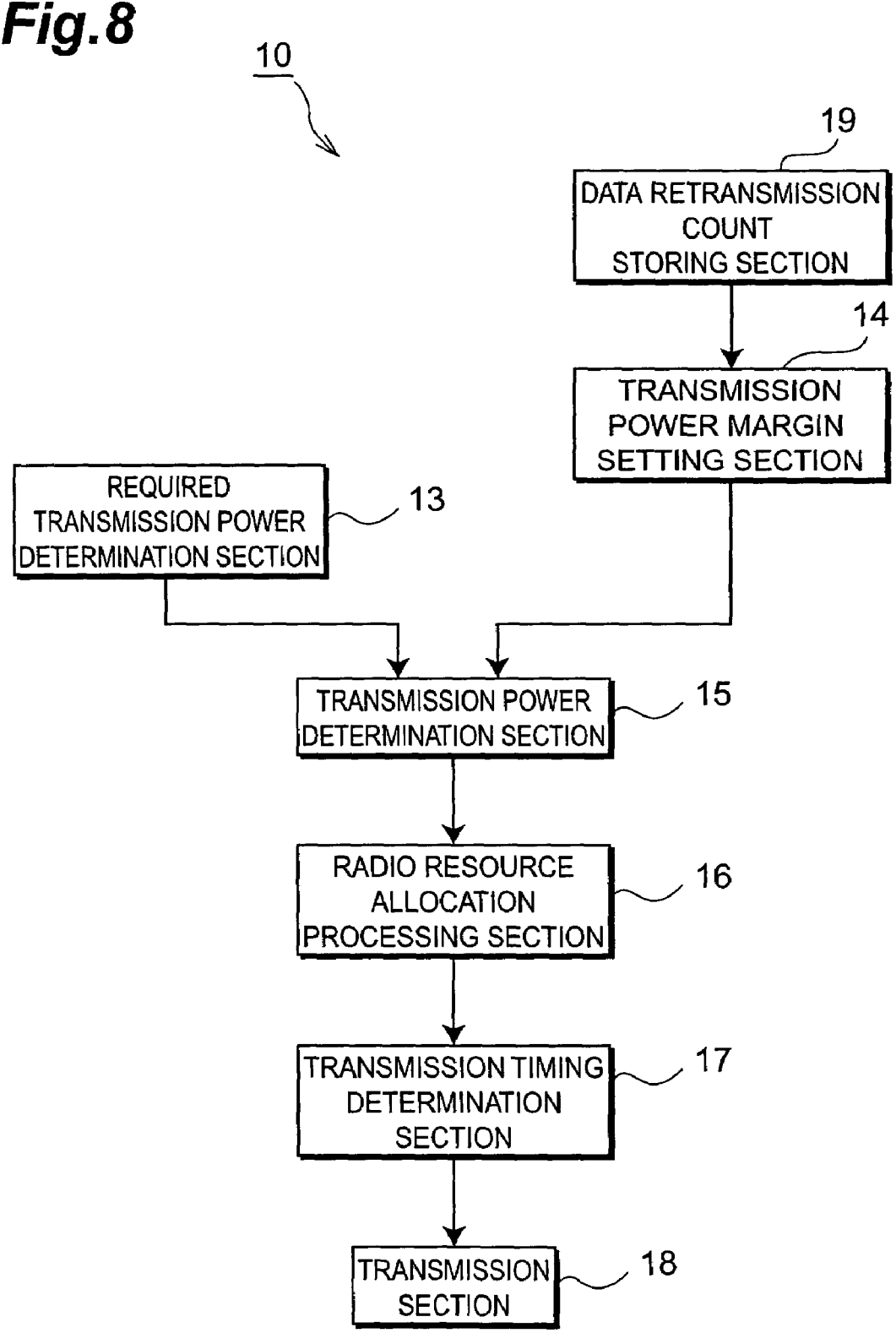
FIG. 8 is a functional block diagram depicting the configuration of the base station according to the second embodiment.

At first, the case when the present invention is applied to a downlink will be described. FIG. 8 shows a configuration of the functional blocks of the base station 10 and the flow of a signal. The configuration of the base station 10 is roughly the same as the above mentioned configuration in FIG. 2.

In the present embodiment, however, the transmission side must count the count of retransmission of a same data. Generally when such a retransmission as ARQ (Automatic Repeat Request) is executed, a sequence number is provided in the units of data to be transmitted. For this, the base station 10 counts the count of transmitting data with a same sequence number (data retransmission count), and stores the result in the data retransmission count storage section 19. The transmission power setting section 14 sets the margin to be provided based on the above data retransmission count. The transmission power determination section 15 determines the transmission power from the above setting result and the required transmission power, which the required transmission power determination section 13 determined based on the preset target SIR. The radio resource allocation processing section 16, transmission timing determination section 17, and the transmission section 18 are the same as the case of FIG. 2. In the second embodiment, the QoS type is not judged.

Figure 9:
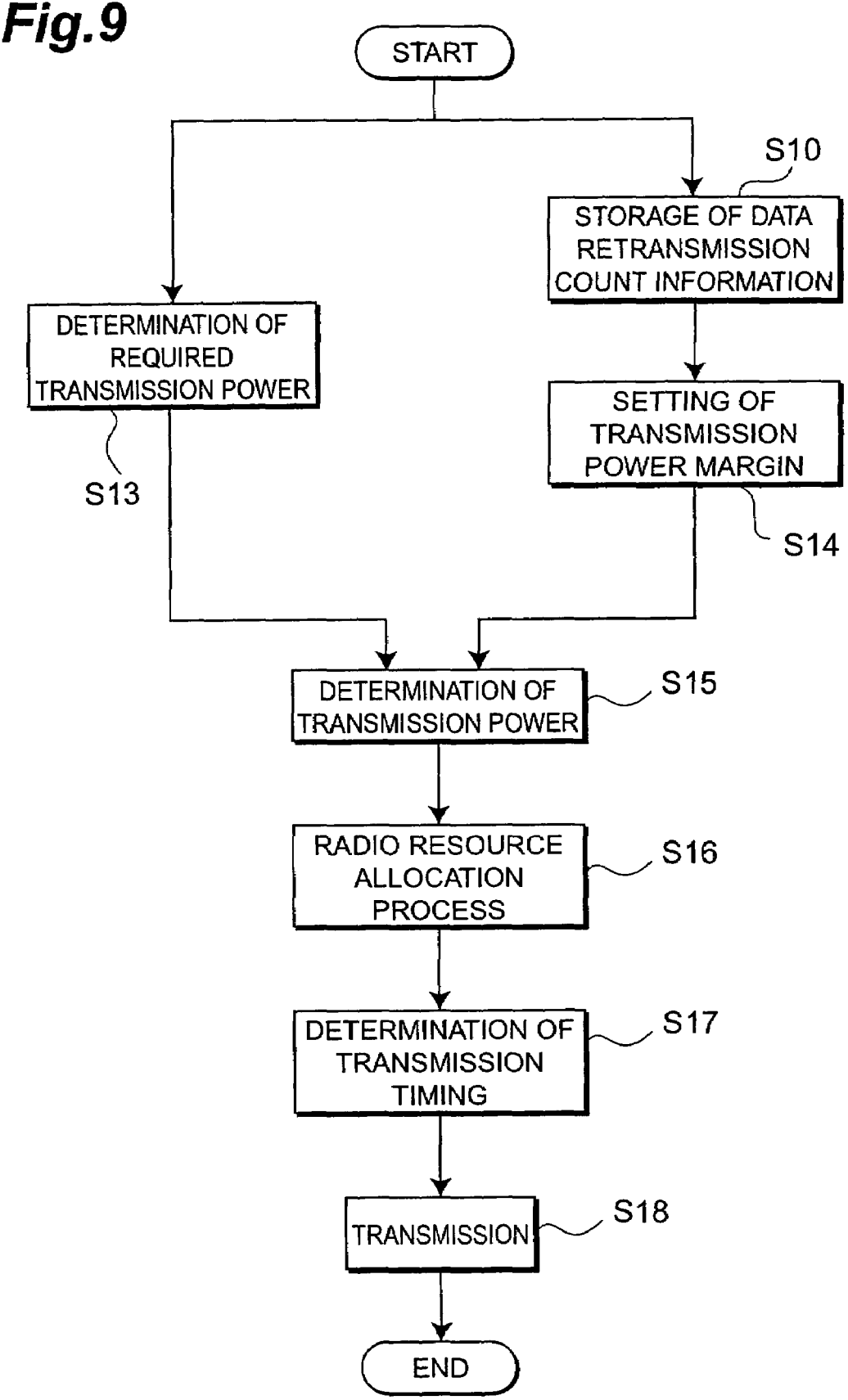
FIG. 9 is a flow chart depicting processing for the downlink in the base station according to the second embodiment.

FIG. 9 shows a flow chart depicting processing in the above mentioned base station 10. Processing identical to that in FIG. 3 is denoted with the same numerals. The base station 10, which is the transmission side of the downlink, counts the count of the transmitting data with the same sequence number (data retransmission count), stores the data retransmission count information in the data retransmission count storage section 19 (S10 in FIG. 9), and the transmission power margin setting section 14 sets the margin to be provided based on the above data retransmission count (S14). On the other hand, the required transmission power determination section 13 estimates the attenuation of the radio propagation path between the base station and the mobile stations, and determines the required transmission power for maintaining the preset communication quality (e.g. target SIR) (S13).

And in S15, the transmission power determination section 15 determines the transmission power including the margin based on the required transmission power determined in S13 and the margin set in S14. Then in S16, the radio resource allocation processing section 16 allocates the radio resource to the mobile station 30 according to the transmission power including the above mentioned margin. And in S17, the transmission timing determination section 17 determines the transmission timing of the data transmission, and in S18, the transmission section 18 transmits the data at this transmission timing.

Figure 10:
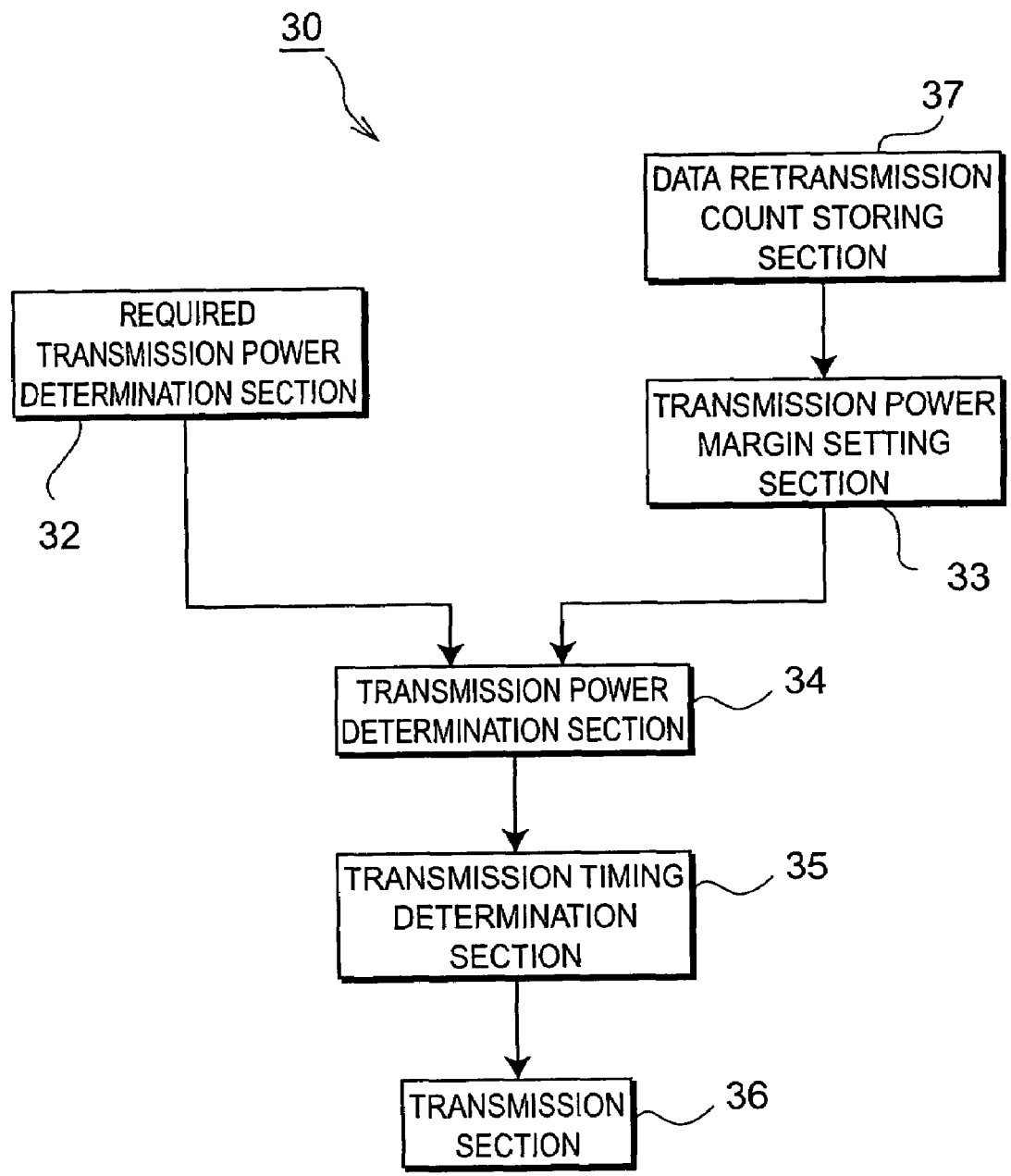
FIG. 10 is a functional block diagram depicting the configuration of the mobile station according to the second embodiment.

Now the case when the present invention is applied to an uplink will be described. FIG. 10 shows a configuration of the functional blocks of the mobile station 30 and the flow of signals. As FIG. 10 shows, the mobile station 30 has a similar configuration of the above mentioned base station 10 in FIG. 8, which is the configuration according to the present invention, but is different from the base station 10 in FIG. 8 in that the mobile station 30 does not have the radio resource allocation processing section. This is because the base station 10 communicating with this mobile station 30 allocates the radio resource, which is not included in the processing performed by the mobile station 30. Operation of the other sections are the same as the case in FIG. 8.

Figure 11:
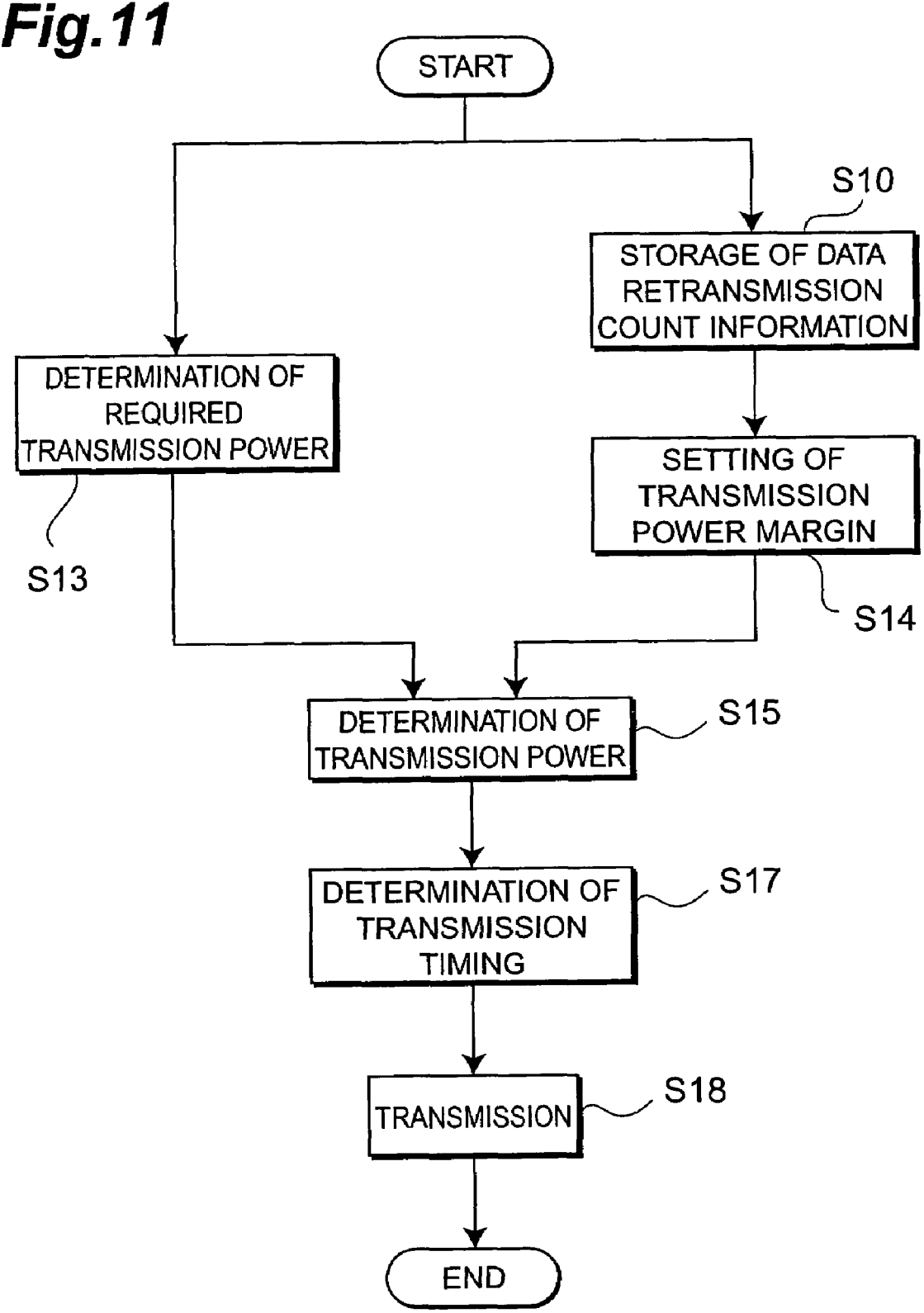
FIG. 11 is a flow chart depicting processing for the uplink in the mobile station according to the second embodiment.

FIG. 11 shows a flow chart depicting processing in the above mentioned mobile station 30. Processing identical with that in FIG. 3 is denoted with identical numerals. The mobile station 30, which is at the transmission side of the uplink, counts the count of transmitting data with the same sequence number (the data retransmission count) and stores the data retransmission count information in the data retransmission count storage section 37 (S10 in FIG. 11), and the transmission power margin setting section 33 sets the margin to be provided based on the data retransmission count (S14). On the other hand, the required transmission power determination section 32 estimates the attenuation of the radio propagation path between the base station and the mobile station, and determines the required transmission power to maintain the preset communication quality (e.g. target SIR) (S13).

And in S15, the transmission power determination section 34 determines the transmission power including the margin based on the required transmission power determined in S13 and the margin set in S14. Then in S17, the transmission timing determination section 35 determines the transmission timing of the data transmission, and in S18, the transmission section 36 transmits the data at this transmission timing.

In the present invention, only the transmission side changes the margin to be provided to the transmission power, so no special processing is required for the reception side. Therefore the processing in FIG. 3, FIG. 5, FIG. 9 and FIG. 11 is installed only for the device at the transmission side.

Figure 12A:
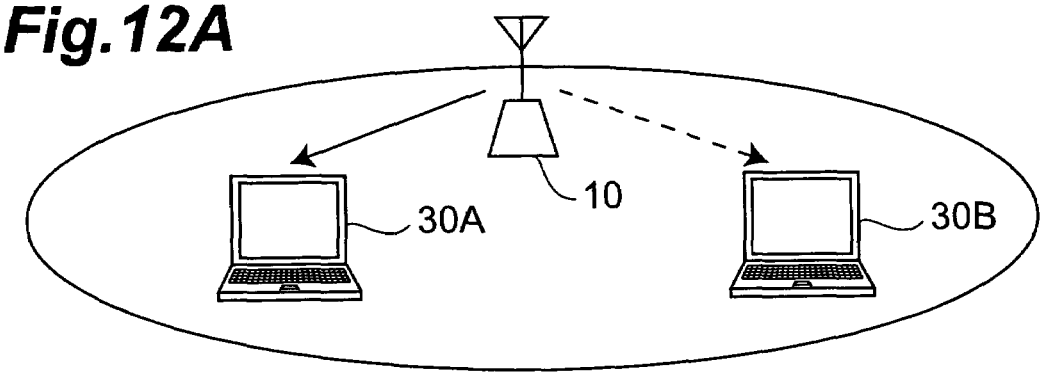
FIG. 12A is a diagram depicting the radio communication system of the second embodiment.

Now the effect of the present embodiment will be described in detail with reference to FIG. 12A-FIG. 12C. Unlike the first embodiment, the second embodiment can be applied if data retransmission is executed even if the QoS requests of the mobile stations 30 are the same. In FIG. 12A, one base station 10 and the mobile stations 30A and 30B are communicating, where the mobile stations 30A and 30B are using the same type of application. It is assumed, however, that the mobile station 30A has a good reception status on the radio link, transmitting/receiving data sequentially without error, but the mobile station 30B has a poor reception status, where changes of the reception level is large, and even though data is received errors occur continuously.

Figure 12B:
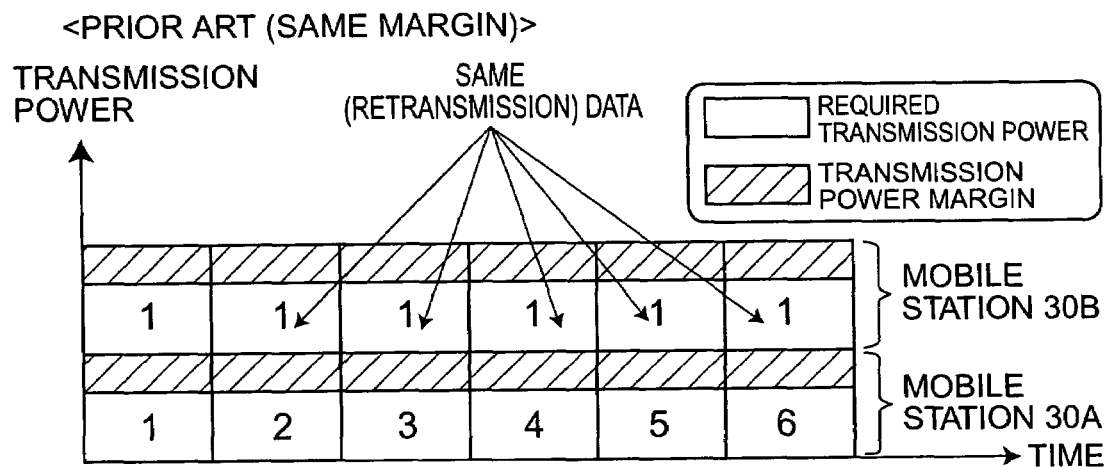
FIG. 12B is a graph indicating the transmission power margin set by prior art.

In prior art, as FIG. 12B shows, the transmission power margin is constant, so if a reception error occurs and data is retransmitted, retransmission is repeated in a range which does not exceed the maximum retransmission count, and not only the efficiency of using the radio resource drops, but also the communication quality of the mobile station B deteriorates.

Figure 12C:
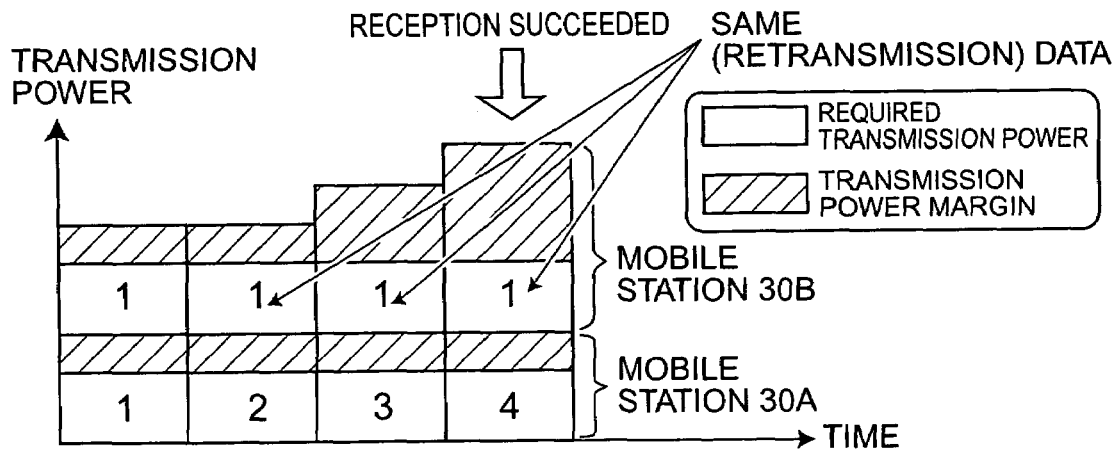
FIG. 12C is a graph indicating the transmission power margin set by the present invention.
Figure 13A:
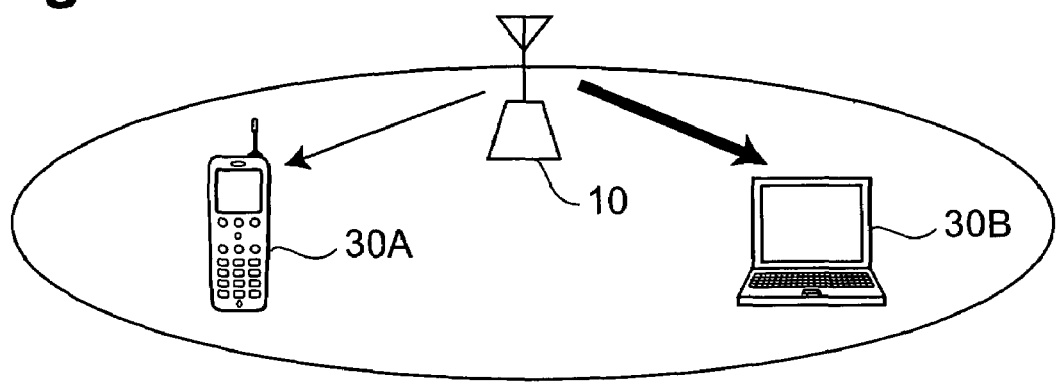
FIG. 13A is a diagram depicting the radio communication system according to prior art for controlling the transmission power and the transmission rate in a CDMA system.
Figure 13B:
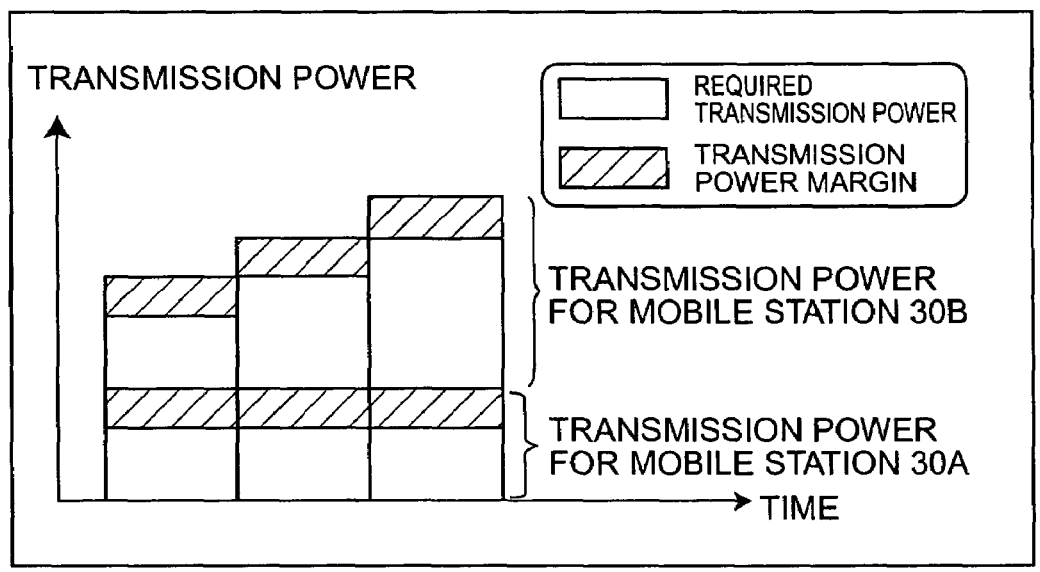
FIG. 13B is a graph indicating the transmission power margin according to prior art for controlling the transmission power and the transmission rate in a CDMA system.
Figure 14:
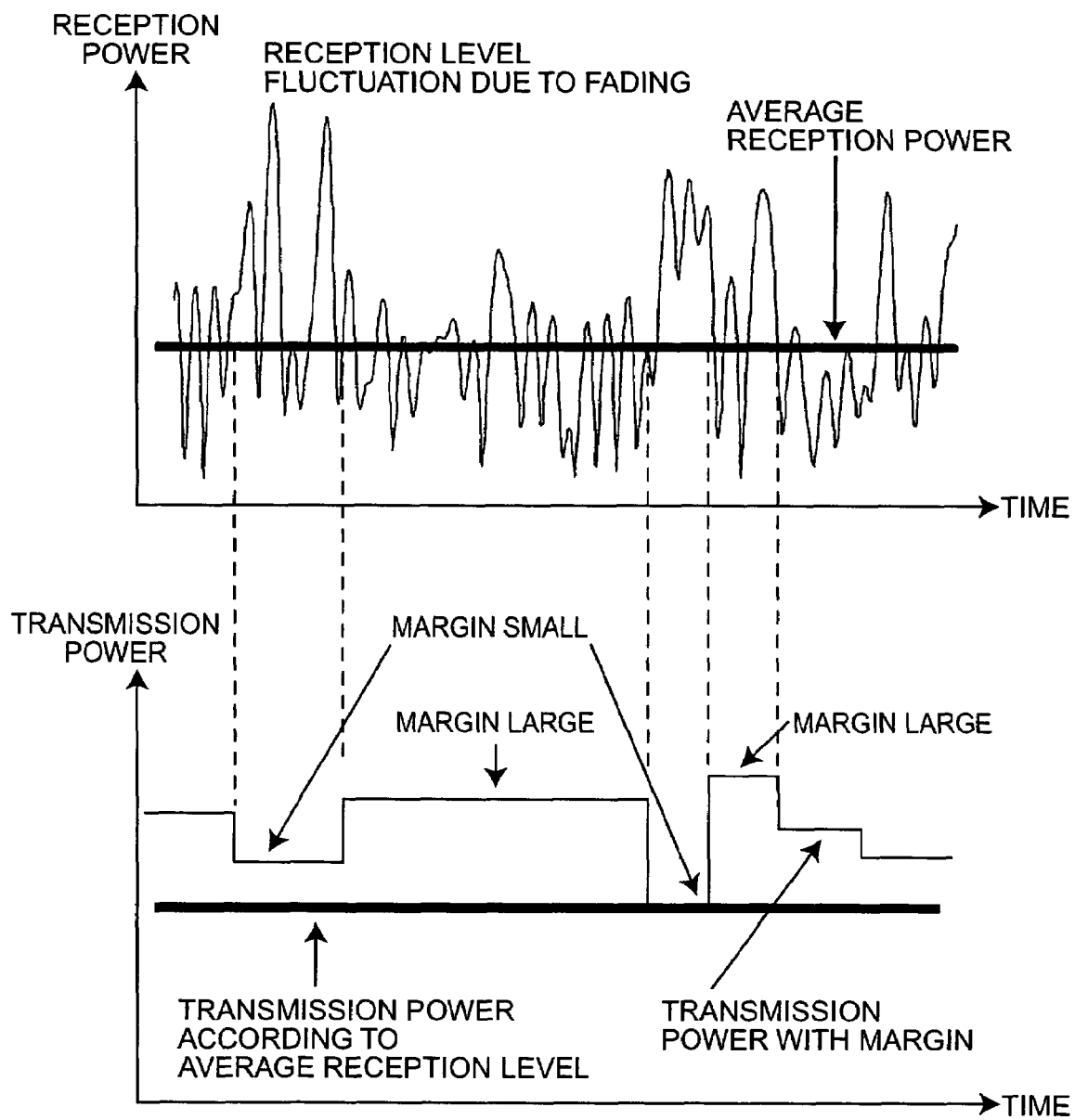
FIG. 14 is a diagram depicting prior art for changing the value of the margin according to the size of the fading fluctuation.

If the present invention is applied here, the transmission power margin of the mobile station 30B is increased as the retransmission count increases, as shown in FIG. 12C, so retransmission data can be successfully received sooner. If the margin of the mobile station 30B is suddenly increased at this time, the count of the retransmission to the mobile station 30B can be decreased considerably, but interference to other mobile stations is radically increased, so considering the entire system, it is preferable to increase the transmission margin of the mobile station 30B in steps. The margin is increased only for the mobile station 30, which is continuously causing the reception error, so compared with the case of prior art where retransmission is repeated without changing the transmission power margin, the efficiency of the radio resource to be used (time and transmission power in this case) can be improved by applying the present invention.

Various embodiments of the present invention were described above in detail. The point of the present invention is setting the margin to be provided to the transmission power, which is a fixed value in prior art, to a different value depending on the QoS type or retransmission count.

The above first and second embodiments are independently implemented, and can be implemented as a combination.

Here the present invention was described using a CDMA cellular system as an example, but the present invention can be applied to various radio communication systems including CDMA and TDMA, and also can be applied for both uplink and downlink, so this is a technology which has a very wide application range.

The present invention is a transmission power control method in a radio communication system aiming at supporting various QoSs and the effective use of resources. Specifically, the margin which the transmission side provides to the transmission power is set according to (1) the QoS type (e.g. real-time application or non-real-time application) and (2) the data retransmission frequency.

Of these, the method of changing the transmission power margin according to the QoS in (1) is a method of using the difference of the QoS requests between the real-time application and the non-real-time application, and by suppressing the transmission power of the mobile station which uses a non-real-time application transmitting data with high power, the efficiency of the radio resource can be improved and interference on the peripheral mobile stations can be decreased. Also the communication quality of a mobile station which uses a real-time application can be guaranteed, and the communication quality of a mobile station which uses a non-real-time application can be sufficiently recovered by retransmission. If this cannot be recovered, the communication quality can be compensated for by the method in (2), which sets the margin depending on the data retransmission frequency. Particularly in the mobile communication system which must support various QoS requests in the future, the present invention is an especially effective technology.

For the method in (2) as well, the probability of a reception error can be decreased by increasing the transmission power margin as the retransmission count increases, and the radio resource can be effectively used by decreasing the retransmission count, but also the QoS request of a non-real-time application can be supported. Since this is not a method of using ACK/NACK in the retransmission protocol, the processing procedure is simple and installation is easy.

What is claimed is:

1. A transmission power control method in a radio communication system comprising a base station and mobile stations, comprising:

determining that a communication to be transmitted from the base station to the mobile station is either real-time traffic or non-real time traffic based on at least one of a transmission delay, maximum retransmission count and reception error rate corresponding to the communication;

determining a transmission power required for radio communication between the base station and the mobile stations;

setting a transmission power margin level added to the transmission power to a first value if the communication is real-time traffic and a second value if the communication is non-real time traffic, wherein the first value is greater than the second value; and transmitting the communication from the base station to the mobile station based on the transmission power margin set in the setting.

2. A transmission power control method in a radio communication system comprising a base station and mobile stations, where data retransmission is allowed in radio communication between the base station and the mobile stations, the method comprising:

determining a transmission power required to satisfy a predetermined reception error rate required for radio communication between the base station and the mobile stations; and setting a transmission power margin level added to the required transmission power so that the added transmission power margin level increases as the data retransmission count in an uplink or in a downlink increases.

3. A communication device, comprising:

means for determining that a communication to be transmitted between a base station to a mobile station is either real-time traffic or non-real time traffic based on at least one of a transmission delay, maximum retransmission count and reception error rate corresponding to the communication;

means for determining a transmission power required for radio communication between the base station and the mobile stations;

means for setting a transmission power margin level added to the transmission power to a first value if the communication is real-time traffic and a second value if the communication is non-real time traffic, wherein the first value is greater than the second value; and means for transmitting the communication based on the transmission power margin set by the setting means.

4. A communication device, comprising:

means of determining a transmission power required for satisfying a communication service quality required for radio communication with other communication devices;

means of allocating a radio resource based on the determined transmission power and transmitting data using said radio resource, where data retransmission is allowed via said radio communication;

retransmission count storing means for counting a retransmission count when a same data is retransmitted and storing said retransmission count;

margin setting means for setting a transmission power margin level added to the transmission power so as to increase the transmission power margin as said retransmission count increases; and transmission power determination means for determining a transmission power based on the set transmission power margin and said required transmission power.

5. A radio communication system comprising a base station and a mobile station, wherein both said base station and said mobile station comprise:

means for determining a transmission power required to satisfy a service quality required for radio communication between the base station and the mobile station;

retransmission count storing means for counting a retransmission count when a same data is retransmitted between the base station and mobile station and storing said retransmission count;

margin setting means for setting a transmission power margin level added to the transmission power so as to increase the transmission power margin as said retransmission count increases; and transmission power determination means for determining a transmission power based on the set transmission power margin and said required transmission power.

6. A base station, comprising:

a determining unit configured to determine that a communication to be transmitted from the base station to a mobile station is either real-time traffic or non-real time traffic based on at least one of a transmission delay, maximum retransmission count and reception error rate corresponding to the communication;

a transmission power determining unit configured to determine a transmission power required for radio communication between the base station and the mobile station;

setting unit configured to set a transmission power margin level added to the transmission power to a first value if the communication is real-time traffic and a second value if the communication is non-real time traffic, wherein the first value is greater than the second value; and a transmitter transmitting the communication from the base station to the mobile station based on the transmission power margin set in the setting.

7. A base station, comprising:

a determining unit configured to determine a transmission power required to satisfy a predetermined reception error rate required for radio communication between the base station and the mobile stations; and a setting unit configured to set a transmission power margin level added to the required transmission power so that the added transmission power margin level increases as the data retransmission count in an uplink or in a downlink increases.

* * * * *